2,970,984
Patented Feb. 7, 1961

2,970,984
EPOXYALKYL ALKENYLARYL ETHERS

Gaetano F. D'Alelio, South Bend, Ind., assignor to Koppers Company, Inc., a corporation of Delaware No Drawing. Continuation of application Ser. No. 463,608, Oct. 20, 1954. This application Nov. 19, 1957, Ser. No. 697,308

7 Claims. (Cl. 260—47)

This application is concerned with certain new epoxyalkyl alkenylaryl ethers. It is concerned with these substances in their monomeric as well as polymeric form.

Further, the invention is concerned with insoluble or "cured" polymers which can be obtained by aftertreating epoxyalkyl alkenylaryl ether polymers to cause cross-linking. This application is a continuation of my co-pending application S.N. 463,608, filed October 20, 1954.

The invention is particularly concerned with epoxyalkyl alkenylaryl ethers of the formula

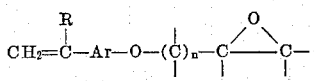

in which R is chosen from the class consisting of hydrogen and methyl, Ar is an arylene radial, n is an integer having a value no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms.

In particular the invention is concerned with glycidyl alkenylaryl ethers particularly glycidyl vinyl- and isopropenylaryl ethers.

It will be realized that the above-disclosed monomeric substances possess two active polymerizable groups, that is the ethylenically unsaturated alkyl group and the oxirane radical. The co-existence of these different type active polymerizable groups in a single monomer provides means for the controlled production of polymeric materials of varying physical characteristics. It is possible by per-catalysis to cause polymerization through the ethylenically unsaturated group and thereafter cause the oxirane group to react to give varying amounts of cross-linking and thus polymers of varying physical characteristics such as for example, insolubility, infusibility, toughness, etc.

Alternately, the monomeric compounds of this invention can be polymerized via the oxirane radical by, for example, alkaline catalysis, to produce a linear polymeric structure. Thereafter, by suitable catalysis such as for example, benzoyl peroxide or a Friedel-Crafts catalyst such as aluminum chloride, the ethylenically unsaturated portions of the polymer can be caused to react to give varying degrees of cross-linking. Thus, via these different mechanisms polymeric materials of the aforedescribed varying physical characteristics can be produced.

Conveniently, the polymeric materials produced by above-described reactions can be represented in part by the below-setout formulae in which (a) represents units derived by polymerization of the alkenyl portion of the molecule and (b) represents units derived from polymerization by the oxirane portion

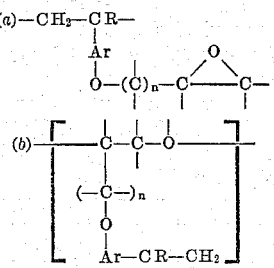

in which R is chosen from the class consisting of hydrogen and methyl, Ar is an arylene radical, n is an integer having a value no greater than 8, and the unoccupied valances are satisfied by substituents of the class consisting of hydrogen and alkyl groups of no more than 7 carbon atoms, the number of carbon atoms in the oxyalkyl group totaling no more than 10 carbon atoms.

Portions of the aforedescribed cross-linked polymeric materials of varying physical characteristics can be represented by the formula

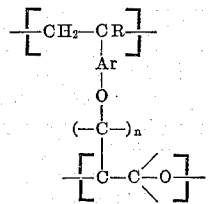

in which R is chosen from the class consisting of hydrogen and methyl, Ar is an arylene radical, n is an integer having a value no greater than 8, and the unoccupied valences are satisfied by substituents of the class consisting of hydrogen and alkyl groups of no more than 7 carbon atoms, the number of carbon atoms in the oxyalkyl group totaling no more than 10 carbon atoms.

The monomeric materials of this invention are useful in the preparation of polymeric materials. As used herein the term "polymer" embraces both homopolymers and copolymers. The term "copolymer" as used herein embraces polymeric materials derived from the polymerization of two or more monomeric materials. That is 2, 3, 4, 5 . . . ad infinitum copolymerizable monomeric substances can be copolymerized to produce "a copolymer."

The polymers and copolymers of this invention are useful as molding, laminating, coating, adhesive and potting compounds. These polymers can be cross-linked by a variety of means. For example, the vinyl polymerized materials which contain oxirane radicals can be cross-linked by heating to rupture the oxirane ring or by catalysis. Further the cross-linking can be effected by a variety of cross-linking agents, such as for exampwle polyisocyanate compounds, polyoxirane compounds, polyamines, polyols, etc.

As used herein the terms "parts" and "percentages" indicate parts and percentages by weight unless otherwise specified.

The invention herein is illustrated by, but not restricted to, the following preferred embodiments.

EXAMPLE I

1-(2-vinylphenoxy)-2,3-epoxypropane

An aqueous solution of 2-vinylphenolate is prepared from 60 grams (0.5 mole) 2-vinylphenol, 21 grams (0.53 mole) sodium hydroxide and 250 ml. water and chilled. This solution is added with stirring over a period of approximately 1 hour to 69.8 grams (0.75 mole) of epichlorohydrin at 60° C. and stirred for an additional hour while the temperatue is maintained at 60°. The reaction mixture is diluted with approximately equal volume of water and extracted with five 100 ml. portions of ether. The ether portions are combined and the ether removed by evaporation under vacuum leaving an oily residue. This oil is flash distilled at approximately 175° C. and 1 mm. mercury to yield a colorless distillate, which is a mixture of 1-(2-vinylphenoxy)-2,3-epoxypropane and minor portions of 1-(2-vinylphenoxy)-2,3-propanediol which diol can be removed by cooling the distillate to approximately minus 5–10° C., and filtration. This diol is disclosed and claimed in my copending application filed concurrently herewith.

The filtrate, after removal of the unsaturated diol contains approximately 90 percent of the epoxypropane compound which is identified by carbon, hydrogen and oxirane analyses and hydrogen consumption, the results of which are in close agreement with the theoretical values.

EXAMPLE II

2-(4-isopropenylphenoxy)-2,3-epoxypropane 4-isopropenylphenolate is prepared from 50 grams (0.37 mole) 4-isopropenyl phenol, 30 grams (0.75 mole) sodium hydroxide and 370 ml. water. This solution is chilled and added over a period of approximately 1 hour to 69 grams (0.75 mole) epichlorohydrin which is maintained at 75° C. Stirring is continued for an additional half hour at 75° C. and one hour at 85° C. The mixture is cooled to approximately room temperature and extracted with four 100 ml. portions of ether. The ether extracts are combined and washed with an equal volume of water and then with approximately 200 ml. water containing 15 grams sodium hydroxide. The ether extract is evaporated under vacuum and there is obtained a waxy solid. The solid is recrystallized from benzene-cyclohexane and several times from benzene to remove a crystalline material which is 1-(4-isopropenylphenoxy)-2,3-propanediol.

The benzene is removed from the filtrate by vacuum evaporation to yield a product which is predominantly isopropenylphenoxy epoxypropane. The epoxypropane compound and diol are characterized by hydrogen absorption, carbon, hydrogen and oxirane oxygen analyses, the results of which are in close agreement with the theoretical values.

The propanediol described immediately above is disclosed and claimed in my copending application filed concurrently herewith.

It will be realized that in Examples I and II for the 2-vinylphenol and 4-isopropenylphenol there used, there can be substituted equimolar quantities of alkenylphenols illustrated by such compounds as for example 3-vinylphenol, 4-vinylphenol, 3-isopropenylphenol, the vinyl- and isopropenyl-1- and -2-naphthols and the like. Similarly in place of epichlorohydrin there can be used other halo-epoxyalkanes such as for example 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxypentane, 2-chloromethyl-1,2-epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane.

There are obtained the various epoxyalkyl alkenylaryl ethers of this invention which are characterized by hydrogen absorption, carbon, hydrogen and oxirane oxygen analyses which are in substantial agreement with the theoretical values. It will be realized that there are obtained by the foregoing procedure minor quantities of the various dihydroxyalkyl-alkenylaryl ethers which are disclosed and claimed in my copending application filed concurrently herewith.

EXAMPLE III

One hundred parts of 1-(2-vinylphenoxy)-2,3-epoxypropane, obtained as in Example I is admixed with one-half part benzoyl peroxide. The atmosphere is alternately purged with nitrogen and evacuated to approximately 0.5 mm. mercury. The compound is then heated at approximately 50–60° C. under an atmosphere of nitrogen. After approximately 18 hours' heating there is obtained polymeric 1-(2-vinylphenoxy)-2,3-epoxypropane which is a linear, soluble polymer containing oxirane oxygen.

There can be substituted for the compound used herein various other 1-(alkenylphenoxy)-2,3-epoxypropanes and there are obtained the corresponding homopolymers.

Further, for the benzoyl peroxide utilized herein there can be substituted a variety of peroxy catalysts such as hydrogen, acetyl, acetylbenzoyl, phthalyl and lauroyl peroxides, tertiary-butyl hydroperoxide, etc., and other percompounds, for example ammonium persulfate, sodium persulfate, sodium perchlorate and the like.

It will be realized that heating can effect rupture of the epoxy ring. Accordingly, it is desirable that the temperatures at which the various vinyl polymerizations are conducted be as low as is possible and at which the polymerization occurs at a sufficiently rapid rate.

EXAMPLE IV

Example III is repeated substituting for the 1-(2-vinylphenoxy)-2,3-epoxypropane 100 parts, 1-(4-isopropenylphenoxy)-2,3-epoxypropane obtained as in Example II. Upon heating at 55° C. for approximately 1 day there is obtained a soluble, linear polymer containing oxirane oxygen.

The various other homopolymeric isopropenylaryl epoxyalkyl ethers of this invention are obtained by substituting for the isopropenylphenoxy epoxypropane used herein, a similar quantity of corresponding isopropenylaryl epoxyalkyl ether. It will be realized that the various percatalysts mentioned above in Example III can be utilized herein in place of the benzoyl peroxide.

The foregoing Examples III and IV illustrated the vinyl-homopolymerization of the compounds of this invention which yield polymers having a plurality of groups of formula

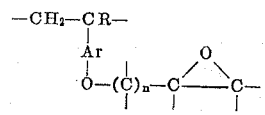

in which R, Ar, $n$ and the like have the meanings heretofore set forth.

It will be realized that mixtures of two or more of the various monomers of this invention can be polymerized together to yield polymeric substances. For example utilizing the procedures of Example III mixtures of 1-(2-vinylphenoxy)-2,3-epoxypropane and 1-(4-isopropenylphenoxy)-2,3-epoxypropane can be polymerized via vinyl polymerization. Additionally, mixtures of two or more of the polymers of this invention can undergo epoxypolymerization according to procedures set forth in the following Example V.

EXAMPLE V

One hundred seventy-five parts 1-(2-vinylphenoxy)-2,3-epoxypropane (prepared as in Example I) is admixed with 2 parts of an aqueous 40 percent sodium hydroxide solution and the mixture heated at approximately 100° C. for approximately 4 hours. There is obtained a soluble linear homopolymeric 1-(2-vinylphenoxy)-2,3-epoxypropane containing a plurality of oxyethylene linkages.

It will be realized that various other epoxyalkyl vinylaryl ethers can be substituted for the 1-(2-vinylphenoxy)-2,3-epoxypropane here used and that their respective homopolymers are obtained. Further, for the sodium hydroxide here used as a catalyst there can be substituted various other strong alkaline hydroxides or weak acids, such as for example, succinic acid.

EXAMPLE VI

Two hundred parts 1 - (4 - isopropenylphenoxy) - 2,3 - epoxypropane (prepared as in Example II) is polymerized according to Example V. There is obtained a soluble, linear homopolymeric 1-(4-isopropenylphenoxy)-2,3-epoxypropane containing a plurality of oxyethylene linkages.

The various epoxyalkyl isopropenylaryl ethers of this invention can be substituted in the foregoing procedure for the 1- (4 - isopropenylphenoxy) - 2,3 - epoxypropane there used and there are obtained their respective homopolymers.

The foregoing examples illustrate the epoxy-homopolymerization of the compounds of this invention which yield polymers having a plurality of units of the formula $$\left[ \begin{array}{c} -\mathrm{C-C-O-} \\ (-\mathrm{C-})_n \\ | \\ \mathrm{O} \\ | \\ \mathrm{Ar-CR=CH_2} \end{array} \right]$$

EXAMPLE VII

Five parts 1-(2-vinylphenoxy)-2,3-epoxypropane, 4.5 parts styrene and one-half part benzoyl peroxide are admixed in a reaction vessel and the atmosphere swept out and filled with nitrogen. The polymerizable mass is heated at 60° C. for 15 hours. There is obtained a soluble, linear, heat-curable copolymer.

EXAMPLE VIII

Thirty-five parts 1-(2-vinylphenoxy)-2,3-epoxypropane are admixed with 20 parts maleic anhydride and 0.1 part benzoyl peroxide. This mass is polymerized according to the procedure set forth in Example VII. There is obtained a soluble linear polymeric product which can be cured by heating or by acid or basic substances.

EXAMPLE IX

Five parts 1-(2-vinylphenoxy)-2,3-epoxypropane, 4.5 parts methyl methacrylate and one-half part benzoyl peroxide are admixed in a reaction vessel and the atmosphere is swept out and filled with nitrogen. The polymerizable mass is heated for 2 hours at 30° C. after which time the polymer is too thick to pour. There is obtained a linear soluble, heat-curable copolymer.

EXAMPLE X

A mixture of 5 parts 1-(2-vinylphenoxy)-2,3-epoxypropane, 45 parts acrylonitrile and 1 part benzoyl peroxide is prepared and the atmosphere swept out and filled with nitrogen. After heating 3 hours at 30° C. and 23 hours at 55° C. a hard polymerization product is obtained. There is obtained a linear, heat-curable copolymer soluble in dimethyl formamide.

EXAMPLE XI

A mixture of 5 parts 1-(2-vinylphenoxy)-2,3-epoxypropane, an equimolar quantity of butadiene, and 2 parts benzoyl peroxide is prepared and the atmosphere swept out and filled with nitrogen. After heating 3 hours at 30° C. and 20 hours at 60° C. there is obtained an elastomeric polymer.

For the various ethylenic unsaturated monomers utilized in combination with 1-(2-vinylphenoxy)-2,3-epoxypropane in Examples VII through XI inclusive, there can be used various other copolymerizable ethylenically unsaturated monomers such as, for example, vinylaryls, e.g. substituted styrenes such as methyl and dimethylstyrenes, chloro- and polychlorostyrenes, cyanostyrenes, etc., vinylnaphthalenes, etc.; vinyl and vinylidine chlorides; acrylic acid and the acrylates e.g. methyl and ethylacrylates, and the like. Further, mixtures of one or more of these copolymerizable ethylenic unsaturated monomers can be utilized in place of the single monomers utilized in the immediately foregoing copolymer examples.

Similarly, in place of the 1-(2-vinylphenoxy)-2,3-epoxypropane utilized in the foregoing copolymer examples, there can be utilized the various other monomeric epoxyalkyl alkenylaryl ethers of this invention, particularly the isopropenylphenoxy epoxyalkanes. It is to be noted that the isopropenylaryls do not polymerize as rapidly as do the corresponding vinylaryl ethers.

It will be further realized that in place of the single monomeric epoxyalkyl alkenylaryl ethers utilized in the immediately foregoing examples, there can be substituted mixtures of one or more of the epoxyalkyl alkenylaryl ethers of this invention.

The proportions of the epoxyalkyl alkenylaryl ethers of this invention and the copolymerizable ethylenically unsaturated compounds can be varied as desired to give copolymers of varying properties. In copolymers in which the epoxy-group of the epoxyalkyl alkenylaryl ether is to be utilized for cross-linking purposes by aftertreatment of said polymer to produce an insoluble, infusible polymeric composition, it is advantageous to utilize the monomeric epoxyalkyl alkenylaryl ethers in about 2–10 molar percent of the copolymerizable mass.

EXAMPLE XII

A polymerizable mass containing equimolar parts of 1-(2-vinylphenoxy)-2,3-epoxypropane and ethylene oxide are admixed with 1 part succinic acid per 100 parts polymerizable mass and is heated at 80° C. for approximately 4–5 hours. There is obtained a soluble linear copolymer containing a plurality of oxyethylene linkages.

EXAMPLE XIII

Example XII is repeated substituting for the ethylene oxide there used an equimolar quantity of epichlorohydrin. There is obtained a soluble linear copolymer containing a plurality of oxyethylene linkages.

EXAMPLE XIV

Example XII is repeated substituting for the ethylene oxide there used an equimolar quantity of styrene oxide. There is obtained a soluble linear copolymer having a plurality of oxyethylene linkages.

EXAMPLE XV

Example XII is repeated substituting for the ethylene oxide there used an equimolar quantity of glycidyl phenyl ether. There is obtained a soluble linear copolymer having a plurality of oxyethylene linkages.

EXAMPLE XVI

Example XII is repeated substituting for the ethylene oxide there used one-half the molar quantity of the diglycidyl ether of bis-phenol. There is obtained an insoluble copolymer containing a plurality of oxyethylene linkages.

It will be realized that in place of the various oxirane compounds utilized in combination with 1-(2-vinylphenoxy)-2,3-epoxypropane in Examples XII through XVI inclusive, various other copolymerizable oxirane-containing monomers such as for example, propylene oxide, butylene oxide, butylene dioxide, cyclohexene oxide, glycide and the like can be utilized. Similarly, in place of the 1-(2-vinylphenoxy)-2,3-epoxypropane utilized in the immediately foregoing copolymer examples, there can be utilized the various other monomeric epoxyalkyl alkenylaryl ethers of this invention, particularly the vinyl- and isopropenylphenoxy epoxyalkanes.

It will be further realized that in place of the single monomeric oxirane-containing monomers there can be used mixtures of one or more of these copolymerizable oxirane-containing monomers. Additionally in place of the single monomeric epoxyalkyl alkenylaryl ether utilized in the immediately foregoing examples there can be substituted mixtures of one or more of the epoxy- alkyl alkenylaryl ethers of this invention.

As stated before with relation to the vinyl copolymerizations, the proportions of the epoxyalkyl alkenyl- aryl ethers of this invention and the copolymerizable oxirane-containing monomers can be varied as desired to yield a variety of copolymers.

EXAMPLE XVII

The soluble polymer of Example III is heated for 10 hours at 120° C. after which time the polymerization product is too thick to pour at 120° C. Continued heating produces a light yellow solid copolymer which is insoluble in 100 parts methanol or 95 percent ethanol per part polymer; which forms a gel with 100 parts toluene per part polymer and which is swollen by acetone and ethylene dichloride.

Heating of the polymerization products of Examples IV, VII, VIII, IX and X at 80–100° C. for 5–10 hours produces cross-linked polymers which have the solubility characteristics set forth in the following table.

TABLE

| Polymer of Example No. | Solubility at Room Temperature (1 part sample=100 parts solvent) | | | | | | |
|---|---|---|---|---|---|---|---|
| | Water | 10% NaOH | Ethylene Di- chloride | Meth- anol | Ace- tone | Tolu- ene | 95% Eth- anol |
| IV | I | I | I | I | I | I | I |
| VII | | | Sw | I | Sw | G | I |
| VIII | I | I | I | I | I | I | I |
| IX | | I | Sw | I | Sw | Sw | I |
| X | | | I | I | I | I | I |

I=insoluble.
Sw=swollen by solvent.
T=gel or very viscous solution.

EXAMPLE XVIII

One hundred parts of the polymer of Example III is admixed with 4 parts 2,4-toluene diisocyanate and the mixture heated for one hour at 75° C. There is obtained an insoluble, infusible cross-linked copolymer.

There can be substituted in the above procedure for the polymer of Example III used above, polymers produced by the vinyl polymerization of the various epoxy- alkyl alkenylaryl ethers of this invention, particularly the vinyl- and isopropenyl-type ethers. Additionally, there can be substituted for the 2,4-toluene diisocyanate other diisocyanates such as phenylenediisocyanate; 2,6-toluene- diisocyanate; 1,5-naphthalenediisocyanate; 1-chloro-1- phenylene-2,4 - diisocyanate; 4,4' - xenylenediisocyanate; methylene bis(4-phenylisocyanate); hexamethylenediiso- cyanate; tetramethylenediisocyanate and the like. The amount of these diisocyanates utilized is governed by the degree of cross-linking desired.

EXAMPLE XIX

One hundred parts of the polymer of Example VII is admixed with 10 parts of the digylcidyl ether of bisphenol and 1 percent ethylene diamine and the mixture warmed gently. There is obtained a thermoset resin.

EXAMPLE XX

Example XIX is repeated utilizing in place of the digly- cidyl ether of bisphenol an equal weight of the resin described at column 7 of my U.S. Patent 2,658,885, granted November 10, 1953. There is obtained a thermoset resin. It will be realized that the various epoxy alkoxy hydrocarbon substituted phenol aldehyde resins described in that patent can be utilized in the foregoing procedure. Additionally the epoxy alkoxy chlorine substituted phenol aldehyde resins described in my U.S. Patent 2,658,884, granted November 10, 1953, can be utilized in the foregoing procedure.

It is to be noted that in place of ethylene diamine catalyst utilized in Examples XIX and XX there can be substituted equivalent portions of such amine catalysts as tetrahydroquinoline and piperidine to obtain substantially similar results.

EXAMPLE XXI

One hundred parts of the polymer of Example III is admixed with 10 parts of the hexamethylene diamine and the mixture heated at 100° C. for 3–4 hours. There is obtained a thermoset polymer. For the hexamethylene- diamine utilized herein there can be substituted varying quantities of other diamines such as for example, ethyl- ene, propylene, tetramethylene, decamethylene, phenyl- ene, tolylene, and the like diamines.

It is to be understood that in Examples XVIII–XXI inclusive, which illustrate various cross-linking reactions of the polymer product of Example III, there can be substituted for this polymeric product any of the polymers of this invention containing oxirane oxygen. The various homopolymers and copolymers of the epoxyalkyl alkenyl- aryl ethers of this invention obtained by per-catalyzed polymerization, or mixtures thereof, can be reacted with such cross-linking agents as polyisocyanate compounds, polyoxirane compounds, polyamines, phenolic resins and aminoplasts, e.g. ureas, melamines, etc., to produce ther- moset resins.

The foregoing examples set forth the preparation of a number of monomers and polymers of this invention. It will be realized that these examples illustrate methods of preparation which are applicable to a wide range of starting materials to produce monomers and polymers of this invention. For example, the reaction of the alkali metal salts of various alkenylaryloxy compounds with halo-epoxyalkanes yields the monomers of this invention and the alkali metal halides. It is to be understood that the term "aryl" embraces a variety of aromatic nuclei such as phenyl, naphthyl, and the lower alkyl and halogen substituted nuclei, that is the aryl nuclei containing one or more methyl, ethyl, propyl, butyl, chloro- or bromo- substituents.

While the invention has been described with reference to particular embodiments thereof, it will be understood that in its broadest aspects the invention may be various- ly embodied within the scope of the invention as set forth herein and in the appended claims.

I claim:

1. A copolymer of an epoxyalkyl alkenylaryl ether of the formula

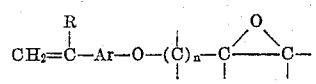

in which R is chosen from the class consisting of hydro- gen and methyl, Ar is an arylene radical, $n$ is an integer having a value of at least one and no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms and at least one other copolymerizable oxirane-containing monomer prepared by heating a mixture of the monomers defined aforesaid in the presence of a catalytic amount of a catalyst selected from the group consisting of strongly alkaline hydroxides and weak organic acids.

2. A copolymer of claim 1 in which the copolymerizable oxirane containing monomer is ethylene oxide.

3. A copolymer of claim 1 in which the copolymerizable oxirane containing monomer is epichlorohydrin.

4. A copolymer of claim 1 in which the copolymerizable oxirane containing monomer is styrene oxide.

5. A copolymer of claim 1 in which the copolymerizable oxirane containing monomer is glycidyl phenyl ether.

6. A copolymer of claim 1 in which the copolymerizable oxirane containing monomer is diglycidyl ether of bisphenol.

7. A polymeric composition comprising the heat reaction product of (a) a copolymer, prepared by heating a mixture of the monomers defined hereafter in the presence of a catalytic amount of a catalyst selected from the group consisting of peroxides, persulfates and perchlorates, of an epoxyalkyl alkenylaryl ether of the formula

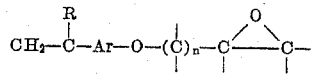

in which R is chosen from the class consisting of hydrogen and methyl, Ar is an arylene radical, $n$ is an integer having a value no greater than 8, and the unoccupied valences are satisfied by substituents of the class consisting of hydrogen and alkyl groups of no more than 7 carbon atoms, the number of carbon atoms in the epoxyalkyl group totaling no more than 10 carbon atoms and at least one other copolymerizable ethylenically unsaturated monomer with (b) a copolymerizable oxirane-containing monomer, said heat reaction product being prepared by heating the mixture of (a) and (b) in the presence of a catalytic amount of a catalyst selected from the group consisting of strongly alkaline hydroxides and weak organic acids.

No references cited.

UNITED STATES PATENT OFFICE
CERTIFICATION OF CORRECTION

Patent No. 2,970,984                             February 7, 1961

Gaetano F. D'Alelio

It is hereby certified that error appears in the above numbered patent requiring correction and that the said Letters Patent should read as corrected below.

Column 1, line 30, for "radial" read -- radical --; column 2, line 57, for "exampwle" read -- example --; column 3, line 30, for "2-(4-" read -- 1-(4- --; column 4, line 15, for "18 hours' heating" read -- 18 hours heating --; column 5, line 62, for "heatiing" read -- heating --; column 7, line 37, in the Table, for that portion of the heading reading "(1 part sample=100 parts solvent)" read -- (1 part sample + 100 parts solvent) --; same Table, line 49, in the footnote thereto, for "T=gel or very viscous solution." read -- G=gel or very viscous solution. --; column 10, lines 4 and 5, for that portion of the formula reading

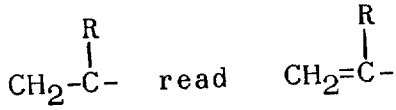

Signed and sealed this 11th day of July 1961.

(SEAL)
Attest:
ERNEST W. SWIDER
Attesting Officer

DAVID L. LADD
Commissioner of Patents